United States Patent Office 3,451,352
Patented June 24, 1969

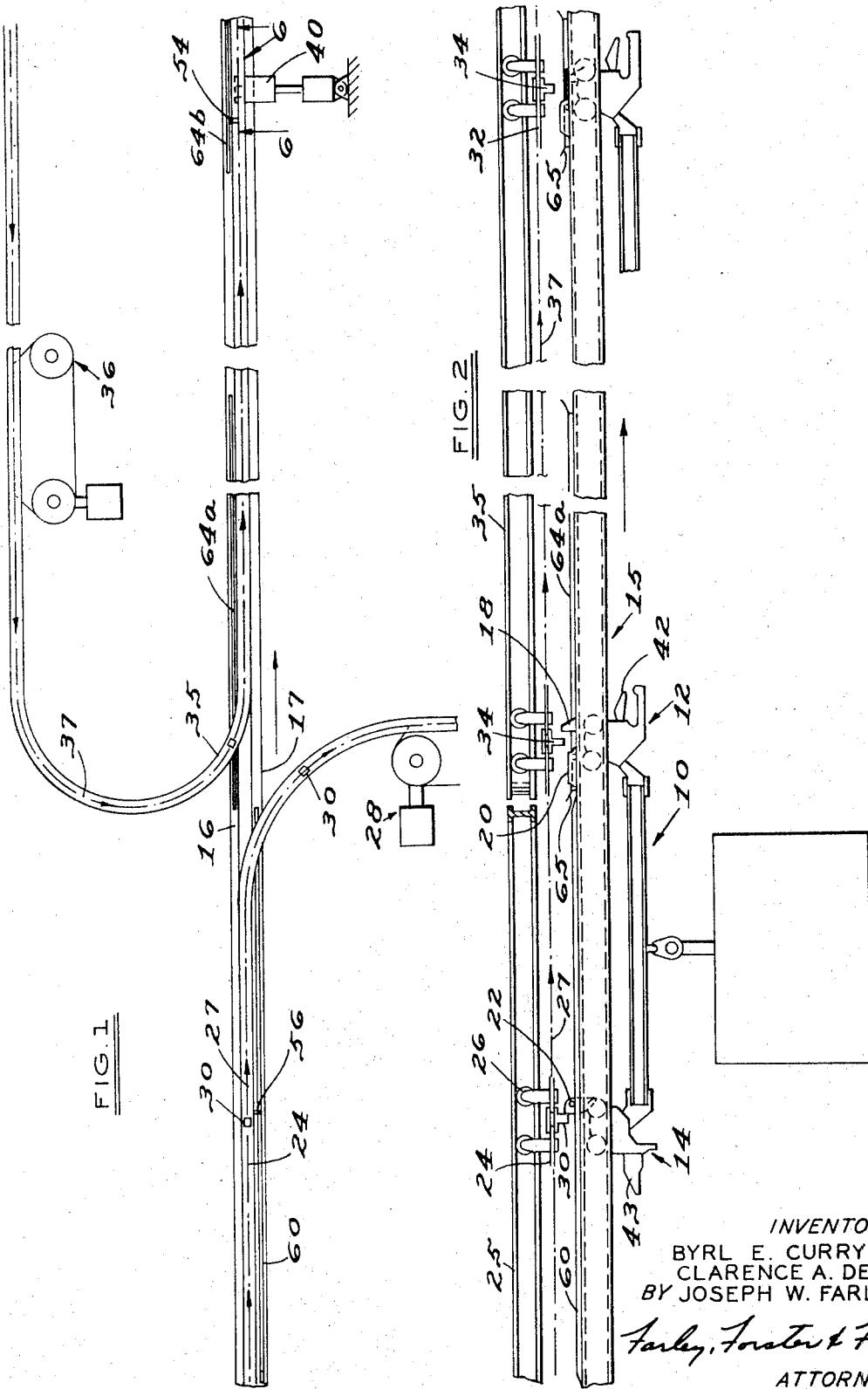

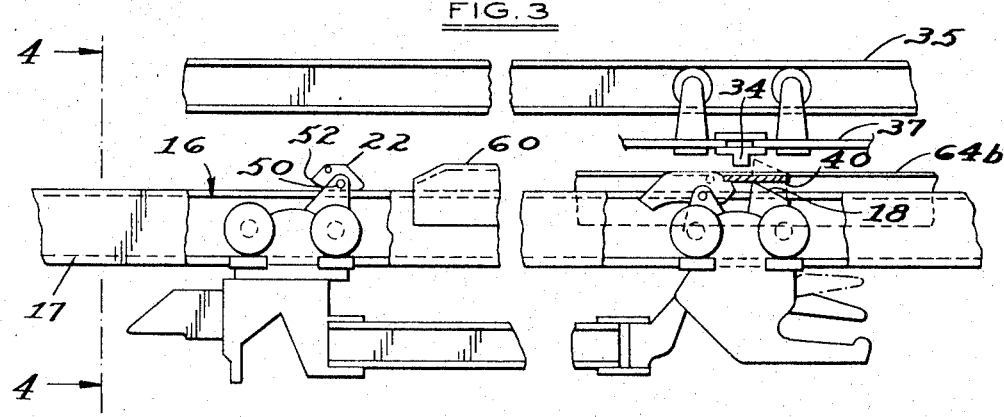
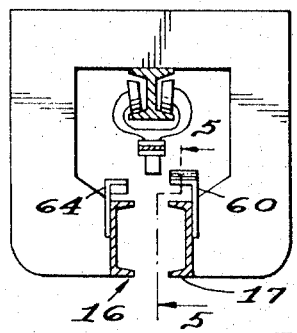
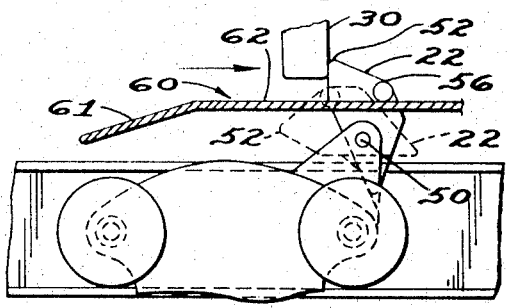
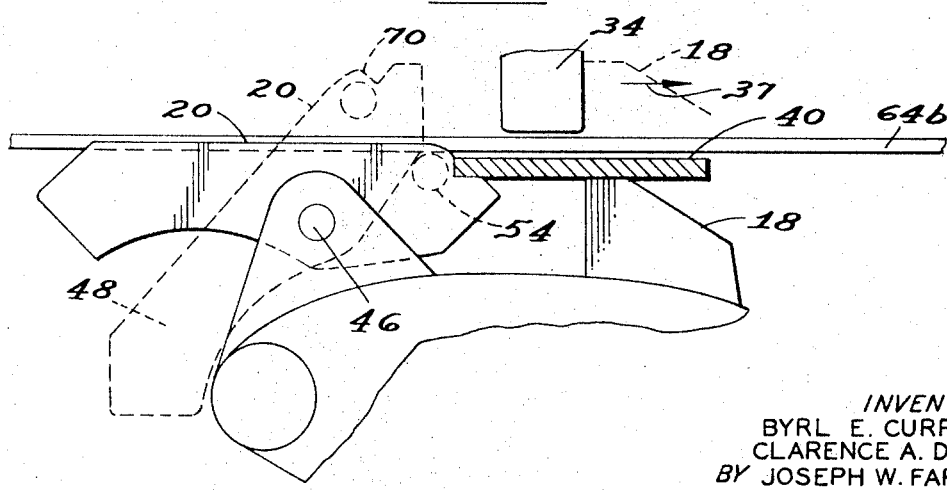

3,451,352
CONVEYOR CARRIER WITH SELECTIVELY OPERABLE DOGS
Byrl E. Curry, Milford, Clarence A. Dehne, Orchard Lake, and Joseph W. Farley, Grosse Pointe Farms, Mich., assignors to Jervis B. Webb Company, a corporation of Michigan
Filed Feb. 10, 1966, Ser. No. 526,618
Int. Cl. B61b *9/00;* E01b *25/26*
U.S. Cl. 104—172  12 Claims

ABSTRACT OF THE DISCLOSURE

A power and free conveyor including a track for a load carrier which is equipped with a main driving dog, movable between non-driving and driving positions relative to a pusher of a propelling chain supported on a separate track, and with one or more auxiliary dogs such as a holdback dog and a supplementary driving dog. Such an auxiliary dog is selectively movable independently of the main driving dog as desired, by cam and follower means on the carrier and carrier track, to change the auxiliary dog from a normally operative to an inoperative position or from a normally inoperative to an operative position relative to a pusher.

---

This invention relates to improvements in conveyors of the power and free type having a load carrier mounted on a supporting track and provided with a main driving dog which is engageable by a pusher of a separately supported driven chain to propel the carrier. The carrier is also usually equipped with one or more auxiliary dogs such as a holdback dog and a supplementary driving dog, and the present invention is particularly directed to an improved construction for selectively rendering the auxiliary dogs operative or inoperative with relation to a pusher.

It is conventional practice to equip a load carrier of a power and free conveyor with a main driving dog and with a holdback dog adjacent the main driving dog so that a pusher may be trapped between these two dogs; and, in some installations, the carrier is also equipped with a supplementary driving dog spaced behind the main and holdback dogs for engagement by a pusher when engagement between a preceding pusher and the main driving dog is lost as is the case when a carrier is being advanced through a transfer zone from a forwarding propelling member to a receiving propelling member.

In these conventional arrangements the auxiliary dogs on the carrier—namely, the holdback dog and supplementary driving dog—can interfere with the desired mode of operation under certain circumstances. For example, in transferring the carrier from a faster moving forwarding propelling member to a slower moving receiving propelling member, the holdback dog may overtake a pusher of the latter and create a serious jamming condition; and if the carrier is equipped with a main dog of the releasable type which is movable to a non-driving position so that carriers may be accumulated in a bank, both the holdback and supplementary driving dogs can interfere with a pusher. One solution to these interference problems is taught in Patent No. 3,229,645 involving the use of main, holdback and supplementary driving dogs of different lengths in combination with varying spacing between the carrier supporting track and pushers of a propelling member so that at a certain spacing only certain of the dogs are engageable by a pusher.

The principal object of the present invention is to provide a solution for the problems of interference between a pusher and an auxiliary dog or dogs of a carrier which offers improved flexibility and ease of installation, and which eliminates the possibility of such interference in transferring a carrier from a forwarding to a receiving propelling member, in stopping a carrier by a stopping device mounted alongside the supporting track, and in the accumulation of carriers in a bank.

According to the invention, a conveyor including a track for supporting a load carrier having a main driving dog engageable by a pusher of a propelling member and an auxiliary dog located on the carrier in longitudinally spaced trailing relation to the main dog with respect to the forward direction of carrier movement, is characterized by means mounting the auxiliary dog on a carrier for movement between an operative position in which the auxiliary dog is engageable by a pusher and an inoperative position in which the auxiliary dog is not so engageable, means normally urging the auxiliary dog to one of said positions, and cam and follower means mounted on the carrier and on the carrier supporting track for moving the auxiliary dog to the other of said positions.

Other features and advantages of the invention will appear from the following description of the representative embodiment disclosed in the accompanying drawings in which:

FIGURE 1 is a schematic plan view of a portion of a power and free conveyor including a transfer zone between a forwarding propelling member and a receiving propelling member;

FIGURE 2 is a side elevation of the construction shown in FIG. 1;

FIGURE 3 is a fragmentary composite side elevation of a load carrier on an enlarged scale;

FIGURE 4 is a sectional elevation taken substantially as indicated by the line 4—4 of FIG. 3 to show the carrier and propelling member supporting tracks and the cam means, the carrier being omitted for the sake of clarity;

FIGURE 5 is an enlarged side elevation taken as indicated by the line 5—5 of FIG. 4 showing the supplementary driving dog of a carrier; and FIGURE 6 is an enlarged sectional elevation taken as indicated by line 6—6 of FIG. 1 showing the holdback dog of a carrier engaging a stopping device.

Referring to FIGS. 1 and 2, a load carrier 10 includes a front trolley 12 and a rear trolley 14 both supported on a track 15 formed by a pair of opposed channel members 16 and 17 (FIG. 4). The front trolley is equipped with a main driving dog 18 and a holdback dog 20; the rear trolley 14 is equipped with a supplementary driving dog 22. In the construction shown a forwarding propelling member or chain 24 is supported from an I-beam track 25 by trolleys 26 and driven in the direction of the arrow 27 by a drive unit 28, the chain being equipped with spaced pushers 30. A receiving propelling member 32, equipped with pushers 34 is similarly supported from a track 35 and driven by a drive unit 36 in the direction of the arrow 37. The tracks 25 and 35 respectively diverge from and converge with the carrier supporting track 15 at a transfer zone.

The main driving dog 18 of the carrier may be of the releasable type, movable from a driving position in which it is engageable by a pusher 30 or 34 to a non-driving position relative thereto by engagement with a movable stop plate 40 suitably mounted alongside the carrier supporting track, or by operation of a releasing lever 42 on the front of a carrier when engaging a cam 43 on the rear of a preceding stopped carrier. This releasable driving dog construction is more fully disclosed in U.S. Patent 3,044,416 and enables carriers to be accumulated in a bank.

In order to permit carriers to be transferred, stopped or accumulated as desired without interference from the auxiliary holdback and supplementary driving dogs 20 and 22, these auxiliary dogs are constructed as more clearly shown in FIGS. 3–6. The holdback dog 20 is mounted on the carrier on a transverse pivot 46 and is normally urged to an operative position with respect to a pusher by a counterweighted tail portion 48 formed with the dog. In the operative position, shown in broken line in FIG. 6, the holdback dog 20 projects towards a propelling member to substantially the same extent as does the driving dog 18 in the driving position thereof so that a pusher 34 may be trapped between the driving and holdback dogs in the usual manner.

The second auxiliary dog, or supplementary driving dog 22, is pivotally secured to the trailing trolley 14 by a pin 50 and is provided with a counter-weighted nose portion 52 which normally urges the dog to a inoperative position shown in broken line in FIG. 5 in which the dog is not engageable by a pusher 30 or 34 of one of the propelling members.

Thus, each of the auxiliary dogs 20 and 22 is mounted on the load carrier 10 for movement between an operative position in which the auxiliary dog is engageable by a pusher and an inoperative position in which the auxiliary dog is not so engageable, and is normally urged to one of said positions by the counterweight means. Cam and follower means are mounted on the carrier and on the carrier supporting track for moving an auxiliary dog to the other of its positions along any portion of the path of carrier travel desired.

The cam and follower means in the construction shown consists of a follower pin 54 secured to the holdback dog 20 and projecting laterally thereof to one side of the path of carrier travel, and a similar pin 56 secured to the supplementary driving dog 22 and projecting laterally thereof toward the other side of the path of carrier travel. A cam member 60 is secured to the rail 17 of the carrier supporting track 15 for engagement by the follower 56 of the supplementary driving dog 22 and includes an inclined actuating portion 61 extending angularly to the carrier supporting track and a retaining portion 62 extending parallel thereto, the actuating portion 61 serving to move the supplementary driving dog 22 to the operative position in response to engagement of the follower 56 therewith, and the retaining portion serving to hold the dog in operative position in response to such engagement. Similarly, a cam member 64 is secured to the other rail 16 of the carrier supporting track for engagement by the follower pin 54 of the holdback dog 20, and the cam member 64 also includes actuating and retaining portions 65 (FIG. 2) and 66 for moving and holding the holdback dog 20 in the inoperative position thereof when engaged by the follower pin 54.

Some representative arrangements of the cam members are shown in FIGS. 1 and 2. A cam member 60 for the supplementary driving dog 22 is mounted on the carrier supporting track trail 17 in advance of the transfer zone. As a carrier approaches the transfer zone, propelled by engagement of a pusher 30 with the main driving dog 18, the pusher is trapped in such engagement by the holdback dog 20 in its normal operative position, and the supplementary driving dog 22 is in its normal inoperative position. Cam member 60 is arranged to move the supplementary driving dog 22 to operative position in advance of the transfer zone so that when driving engagement between a forwarding pusher 30 and the main carrier driving dog 18 is lost when the pusher diverges from the path of carrier travel, the supplementary driving dog 22 will be picked up and engaged by a following pusher to advance the carrier through the transfer zone into a position where the main driving dog 18 may be engaged by a pusher 34 of the receiving propelling member.

In order to minimize the possibility of interference between a pusher 34 of the receiving propelling member and the holdback dog 20 of the carrier, particularly in an instance where the driving unit 28 of the forwarding propelling member is operating faster than the driving unit 36 of the receiving propelling member, a cam member 64a is mounted on the supporting track rail 16 for engagement by the follower pin 54 of the holdback dog 20 in advance of the location where the receiving propelling member and carrier supporting tracks 35 and 15 converge. The holdback dog 20 is thus moved to an inoperative position with respect to the receiving pusher 34 and held in such position along the length of track where any possibility of a jamming condition could arise.

Another cam member arrangement is illustrated in connection with the carrier stopping device 40 where a cam 64b is mounted so as to move the holdback dog 20 to its inoperative position with respect to a pusher in advance of the location of the stop plate 40. As shown in FIGS. 3 and 6, the stop plate 40 is engaged by and depresses the carrier driving dog 18 to non-driving position and the holdback dog 20 is provided with an abutment surface 70 which engages the stop plate and arrests forward carrier movement.

Those skilled in the art will appreciate that the invention provides positive control over the position of auxiliary dogs on a carrier and enables the position of an auxiliary dog to be changed from operative to inoperative anywhere desired in a conveyor system, and that this control may, with relative ease, be installed, rearranged and relocated as may be required from time to time in the life of a system. Such changes and modifications as are within the scope of the following claims are to be considered a part of the present invention.

We claim:

1. A conveyor including a track for supporting a load carrier having a main driving dog movable between non-driving and driving position and engageable in the latter position by a pusher of a propelling member, and an auxiliary dog located on the carrier in longitudinally spaced trailing relation to the main dog with respect to the forward direction of carrier movement, characterized by means mounting the auxiliary dog on the carrier for movement between an opeartive position in which the auxiliary dog is engageable by a pusher and an inoperative position in which the auxiliary dog is not so engageable, means normally urging the auxiliary dog to one of said positions, and cam and follower means mounted on the carrier and on the carrier supporting track for moving the auxiliary dog to the other of said positions.

2. A conveyor as claimed in claim 1 wherein the auxiliary dog is a holdback dog normally urged to an operative position.

3. A conveyor as claimed in claim 1 wherein the auxiliary dog is a supplementary driving dog normally urged to an inoperative position.

4. A conveyor as claimed in claim 1 further characterized by the auxiliary dog being pivotally mounted on an axis extending transversely of the carrier, and wherein the follower is secured to the auxiliary dog and extends laterally thereof, the cam being secured to the carrier supporting track and including an actuating portion extending angularly to the carrier supporting track for moving the dog to the other of said positions in response to engagement of the follower therewith, and including a retaining portion extending parallel to the carrier supporting track for holding the dog in the other of said positions along a desired portion of the track.

5. A conveyor as claimed in claim 4 wherein the auxiliary dog is a holdback dog normally urged to an operative position.

6. A conveyor as claimed in claim 5 wherein said holdback dog is provided with an abutment surface thereon which in the inopeartive position of the holdback dog extends substantially normal to the carrier supporting track, and a stop member mounted adjacent the supporting track and positionable in the path of movement of the holdback dog for engagement by the said abutment surface thereof, the cam being mounted adjacent the stop member for positioning and holding the holdback dog in the inoperative position thereof as the holdback dog approaches the location of the stop member.

7. A conveyor as claimed in claim 5 further characterized by a transfer zone at which a carrier is transferred from a forwarding to a receiving propelling member, and the cam being arranged to position and hold the holdback dog in the inoperative position thereof as the carrier is transferred into position for driving engagement of the main driving dog by a pusher of the receiving propelling member.

8. A conveyor as claimed in claim 4 wherein the auxiliary dog is a supplement driving dog normally urged to an inoperative position.

9. A conveyor as claimed in claim 8 further characterized by a transfer zone at which a carrier is transferred from a forwarding to a receiving propelling member, and the cam being arranged to position and hold the supplementary driving dog in operative position in advance of the transfer zone for engagement by a pusher of the forwarding propelling member.

10. A conveyor as claimed in claim 1 further characterized by a second auxiliary dog mounted on the carrier, the first auxiliary dog comprising a holdback dog normally urged to operative position, the second auxiliary dog comprising a supplementary driving dog normally urged to inoperative position, a transfer zone at which a carrier is transferred from a forwarding to a receiving propelling member, and the cam and follower means being arranged to reverse the positions of the holdback and supplementary driving dogs as the carrier passes through the transfer zone.

11. A conveyor as claimed in claim 1 wherein the means normally urging the auxiliary dog to one of said positions comprises a counterweight portion provided on the dog.

12. A conveyor carrier having a holdback dog normally urged to an opeartive position with respect to a pusher of a propelling member, means for moving the holdback dog to an inoperative position with respect to such pusher, and abutment means provided on the holdback dog for engagement with a carrier stopping device when the holdback dog is in the inoperative position thereof.

References Cited
UNITED STATES PATENTS

| | | | |
|---|---|---|---|
| 2,883,942 | 4/1959 | Johnson | 104—172 |
| 3,229,645 | 1/1966 | Dehne | 104—172 |

ARTHUR L. LA POINT, *Primary Examiner.*

D. F. WORTH III, *Assistant Examiner.*

UNITED STATES PATENT AND TRADEMARK OFFICE
CERTIFICATE OF CORRECTION

PATENT NO. : 3,451,352
DATED : June 24, 1969
INVENTOR(S) : B. E. Curry et al

It is certified that error appears in the above-identified patent and that said Letters Patent are hereby corrected as shown below:

Claim 1 should read as follows:

1. A conveyor including a track for supporting a load carrier having a main driving dog movable between non-driving and driving position and engageable in the latter position by a pusher of a propelling member, and an auxiliary dog located on the carrier in longitudinally spaced trailing relation to the main dog with respect to the forward direction of carrier movement, characterized by means mounting the auxiliary dog on the carrier for movement between an operative position in which the auxiliary dog is engageable by a pusher and an inoperative position in which the auxiliary dog is not so engageable, means normally urging the auxiliary dog to one of said positions, and cam and follower means mounted on the carrier and on the carrier supporting track for moving the auxiliary dog to the other of said positions independently of any change in position of the main driving dog.

Signed and Sealed this

Tenth Day of July 1979

[SEAL]

Attest:

Attesting Officer

LUTRELLE F. PARKER
Acting Commissioner of Patents and Trademarks